United States Patent [19]

Morgan et al.

[11] Patent Number: 5,468,446

[45] Date of Patent: Nov. 21, 1995

[54] PELLETIZING OR GRANULATING PROCESS

[75] Inventors: Peter C. Morgan; Alan D. Hart; Philip D. Morgans, all of Filton, Great Britain

[73] Assignees: British Aerospace PLC; BAeSEMA Ltd., both of Hampshere, England

[21] Appl. No.: 202,464

[22] Filed: Feb. 28, 1994

[30] Foreign Application Priority Data

Mar. 3, 1993 [GB] United Kingdom .................. 9304355

[51] Int. Cl.⁶ .................. B22F 1/02; C01B 3/08
[52] U.S. Cl. .................. 419/64; 419/62; 419/63; 419/65; 419/66; 423/657; 423/155
[58] Field of Search .................. 423/657, 153; 419/62–66; 422/237, 238, 239; 264/82; 427/180; 252/188

[56] References Cited

U.S. PATENT DOCUMENTS

| | | | |
|---|---|---|---|
| 3,674,702 | 7/1972 | MacKenzie et al. | 252/188 |
| 4,013,422 | 3/1977 | Spinner et al. | 23/282 |
| 4,055,632 | 10/1977 | Hoffman et al. | 473/657 |
| 4,155,712 | 5/1979 | Taschek | 422/239 |
| 4,292,265 | 9/1981 | Ron et al. | 264/87 |
| 4,341,651 | 7/1982 | Beckert et al. | 252/188.25 |
| 4,404,170 | 9/1983 | Candy et al. | 422/237 |
| 4,572,844 | 2/1986 | Inoue et al. | 427/180 |

FOREIGN PATENT DOCUMENTS 0080066  6/1983  European Pat. Off. .

*Primary Examiner*—Donald P. Walsh
*Assistant Examiner*—John N. Greaves
*Attorney, Agent, or Firm*—Cushman, Darby & Cushman

[57] ABSTRACT

The pelletisation or granulation of a material or mixture of materials the or at least one of which is reactive in a liquid to produce a gas is improved by treating the reactive material prior to final compaction to form a coating thereon of a substance which is less soluble in the liquid than the reactive material. The preferred reactive material is calcium hydride and the preferred coating is calcium carbonate with or without calcium hydroxide.

8 Claims, No Drawings

5,468,446

PELLETIZING OR GRANULATING PROCESS

FIELD OF THE INVENTION

This invention relates to a process of pelletising or granulating a material or mixture of materials the or at least one of which is reactive in a liquid to produce a gas.

BACKGROUND OF THE INVENTION

Conventional methods or processes for producing pellets or granules from a material or mixture of materials at least one of which is reactive basically involve steps of mixing the or each material with further ingredients such as binders, fillers and the like, optionally densifying the mix by light pressing and regrinding and final compaction or pressing of the reground material to the desired shape of pellet or granule. When these conventional methods are followed for materials such as calcium hydride for hydrogen production full fuel cells there can be problems with loss of a percentage of the hydrogen evolution capacity of the calcium hydride by the onset of an initial reaction between the calcium hydride in the pellet and any water vapour in the surrounding air. This in turn introduces inconsistency of length of reaction and amount of hydrogen subsequently evolved in a subsequent reaction such as in a fuel cell with ensuing variation in performance from pellet to pellet. The same problems can arise in a different manner if a pellet or granule comprising or incorporating the reactive material is used to evolve a gas in a liquid such as hydrogen evolution in water.

OBJECTS OF THE INVENTION

Thus one object of the present invention is to provide a generally improved process of pelletising or granulating a material or mixture of materials the or at least one of which is reactive in a liquid to produce a gas, which at least minimises the aforegoing problems.

This and other objects and advantages of the present invention will become more apparent from details disclosed in the following specification where preferred embodiments of the invention are described.

SUMMARY OF THE INVENTION

According to one aspect of the present invention there is provided a process of pelletising or granulating a material or mixture of materials the or at least one of which is reactive in a liquid to produce a gas, in which prior to the step of final compaction to a pellet or granule the reactive material, in particulate or powdered form is treated to coat at least substantially all outer surfaces of the reactive material particles or powder with a substance which is less soluble in the liquid than the reactive material, with the thickness and type of coating being selected to provide a desired amount of control over the reaction of the reactive material in the liquid.

Preferably the active material treatment step is carried out after a step of densification in which the material or mixture of materials is lightly pressed and reground.

Conveniently the reactive material is calcium hydride and the treatment step includes passing a mixture of carbon dioxide gas and water vapour over and/or through the calcium hydride for a time sufficient to form the desired thickness coating of calcium carbonate with or without calcium hydroxide on the calcium hydride to provide the desired amount of control over the reaction of the calcium hydride in water to produce hydrogen gas.

Advantageously the calcium hydride is treated in atmospheric air, dried to substantially 1500 parts per million water and containing substantially 400 parts per million carbon dioxide, for a time in the range of from 8 to 16 hours.

DESCRIPTION OF EMBODIMENTS OF THE INVENTION

Basically the process of pelletising or granulating a material or mixture of materials the or at least one of which is reactive in a liquid to produce a gas according to the present invention involves, prior to the step of final compaction, to a pellet or granule, treating the reactive material, in particulate or powdered form, to coat at least substantially all outer surfaces of the reactive material particles or powder with a substance which is less soluble in the liquid than the reactive material. Thus in effect each particle is encapsulated by the coating. The thickness and type of the coating is selected to provide a desired amount of control over the reaction of the reactive material in the liquid. In general the process involves the steps of particle size selection, weighing out of the constituents of the material or mix of materials for batch of pellets or granules, preparation of a homogenous mixture by blending or tumbling, optional densification involving light pressing of the mixture into loose pellets and regrinding the loose pellets into coarse powder and pressing or compacting the course reground material into the desired pellets or granules. Preferably the active material treatment step is carried out after the step of densification, but it can be carried out at any convenient juncture prior to compaction to a pellet or granule.

EXAMPLE 1

Suitable pellets were made in which the active ingredient was calcium hydride with or without the additional of incidental constituents such as a filler, for example urea or sodium chloride, a binder, such as gelatin, a ballast, such as tungsten or iron to control the rate of fall of the pellet in the liquid, and a surfactant. Such pellets in the absence of the treatment step according to the present invention were found to be very sensitive to the conditions in which the calcium hydride in the particular batch had been stored so that pellets prepared from nominally identical material with very similar chemical analysis produce quite different reaction results. One reason for the wide performance variation between pellets lay in the amount of water vapour in the atmosphere over the calcium hydride material prior to pelletisation. This variation was sufficient to provide the pellets with a different duration of gas evolution in liquid, a different size of gas bubbles evolved and a different shelf life. Whilst it is theoretically possible to provide more uniformity in performance between different pellets by close control of the atmosphere surrounding the calcium hydride during production of the pellet so that the surrounding atmosphere is a dry as possible, this still does not produce complete control as the pellet subsequent to formation is still liable to attack by water vapour in the atmosphere. This can be exacerbated by the use of reactive material in powdered or particulate form, which provides a large surface area liable to attack.

However the introduction of the treatment step according to the present invention in which a mixture or carbon dioxide gas and water vapour is passed over and/or through the calcium hydride reactive material for a time sufficient to form the desired thickness coating of calcium carbonate with or without calcium hydroxide on the calcium hydride resulted in a pellet or granule with a high degree of uniformity in performance. The coating should cover at least substantially all the outer surfaces of the reactive material particles or powder, and preferably all such outer surfaces. Additionally the coating should be substantially uniform in thickness.

Preferably the carbon dioxide gas and water vapour treatment is carried out for a sufficient time such as in the range of from 8 to 16 hours, to provide the desired amount of control over the reaction of the calcium hydride in water to produce hydrogen gas. Preferably the treatment is carried out in atmospheric air dried to substantially 1,500 parts per million water and containing substantially 400 parts per million carbon dioxide. To assist in formation of a uniform thickness coating the particles in the mix should preferably be agitated and tumbled whilst being treated, preferably for several hours. It is thought that the coating which was so produced on the calcium hydride was mainly calcium carbonate with or without some calcium hydroxide.

Pellets produced by the process of the present invention including the treatment step for the reactive material enabled uniformity of performance to be achieved in a number of different ways. The thickness and type of the coating substance on the reactive material control the rate at which gas was liberated in the liquid which in turn control the bubble size range.

Preferably the coating should have a thickness of at least 5 microns.

The rate of gas production depends on the rate at which the surface of the reactive material is exposed to the liquid. Hence the time of onset of the reaction in the liquid of the reactive material is determined by the rate of dissolution of the coating substance in the liquid. Calcium carbonate has a degree of solubility in water of 0.0015 grams per 100 milliliters which is considerably less than that of calcium hydroxide which is 0.019 grams per 100 milliliters.

The effect of coating can be determined during the treatment step by testing samples. For example an untreated pellet containing calcium hydride and weighing 1 gramme may yield 93.6% of the theoretical hydrogen yield in 21 seconds. After 8 hours treatment with 100 liters per hour of a gas containing 1500 parts per million of water and 400 parts per million of carbon dioxide, the gas yield may have fallen to 88% of theoretical in an increased time of 46 seconds. This can be used to control the treatment conditions.

The relatively low solubility of the coating substance in the desired liquid provides an effective delaying barrier to the reaction taking place and to the consequent release of gas. This provides the pellet or granule with improved stability and shelf life and improved uniformity of reaction. Additionally the presence of the coating substance in the pellet or granule provides improved adhesion of the materials in the pellet and improved physical strength and hardness of the resulting pellet. In this context the physical strength and hardness of the coating substance is important as it provides a measure of protection against subsequent damage and breakdown during the final compaction step.

Various modifications and alterations may be made to the embodiments of the present invention described, within the scope of the presence invention as defined in the following claims.

What is claimed is:

1. A process of pelletising or granulating a material comprising calcium hydride which is reactive in water to produce hydrogen gas, the process comprising the steps of:

passing a mixture of carbon dioxide gas and water vapor over and/or through the material for a time sufficient to form a desired thickness of a coating on the material to provide a desired amount of control over the reaction of the calcium hydride in water, the coating comprising calcium carbonate and optionally calcium hydroxide; and compacting the material coated with calcium carbonate to produce said pellets or granules.

2. A process according to claim 1, further comprising a step of lightly pressing and grinding the material to densify the material before treating the material to form the calcium carbonate coating.

3. A process according to claim 1, wherein the step of forming the calcium carbonate coating on the material comprising the calcium hydride is conducted in atmospheric air for a time in the range of from 8 to 16 hours, the atmospheric air having been dried to substantially 1500 parts per million water and containing substantially 400 parts per million carbon dioxide.

4. A pellet or granule produced by the process comprising the steps of:

passing mixture of carbon dioxide gas and water vapor over and/or through a material comprising calcium hydride for a time sufficient to form a desired thickness of a coating on the material to provide a desired amount of control over the reaction of the calcium hydride in water, the coating comprising calcium carbonate and optionally calcium hydroxide; and compacting the material coated with calcium carbonate.

5. A process according to claim 1, wherein the step of coating the material is conducted for a period of time sufficient to provide a thickness of the coating of at least 5 µm.

6. The pellet according to claim 4, wherein the coating has a thickness of at least 5 µm.

7. A pellet or granule having enhanced stability, shelf life, and hardness comprising:

a core comprising calcium hydride; and a coating layer enveloping said core comprising calcium carbonate.

8. The pellet according to claim 7, wherein said coating layer is at least 5 µm thick.

* * * * *